J. R. SNYDER.
AIR BRAKE SYSTEM.
APPLICATION FILED JUNE 10, 1914.

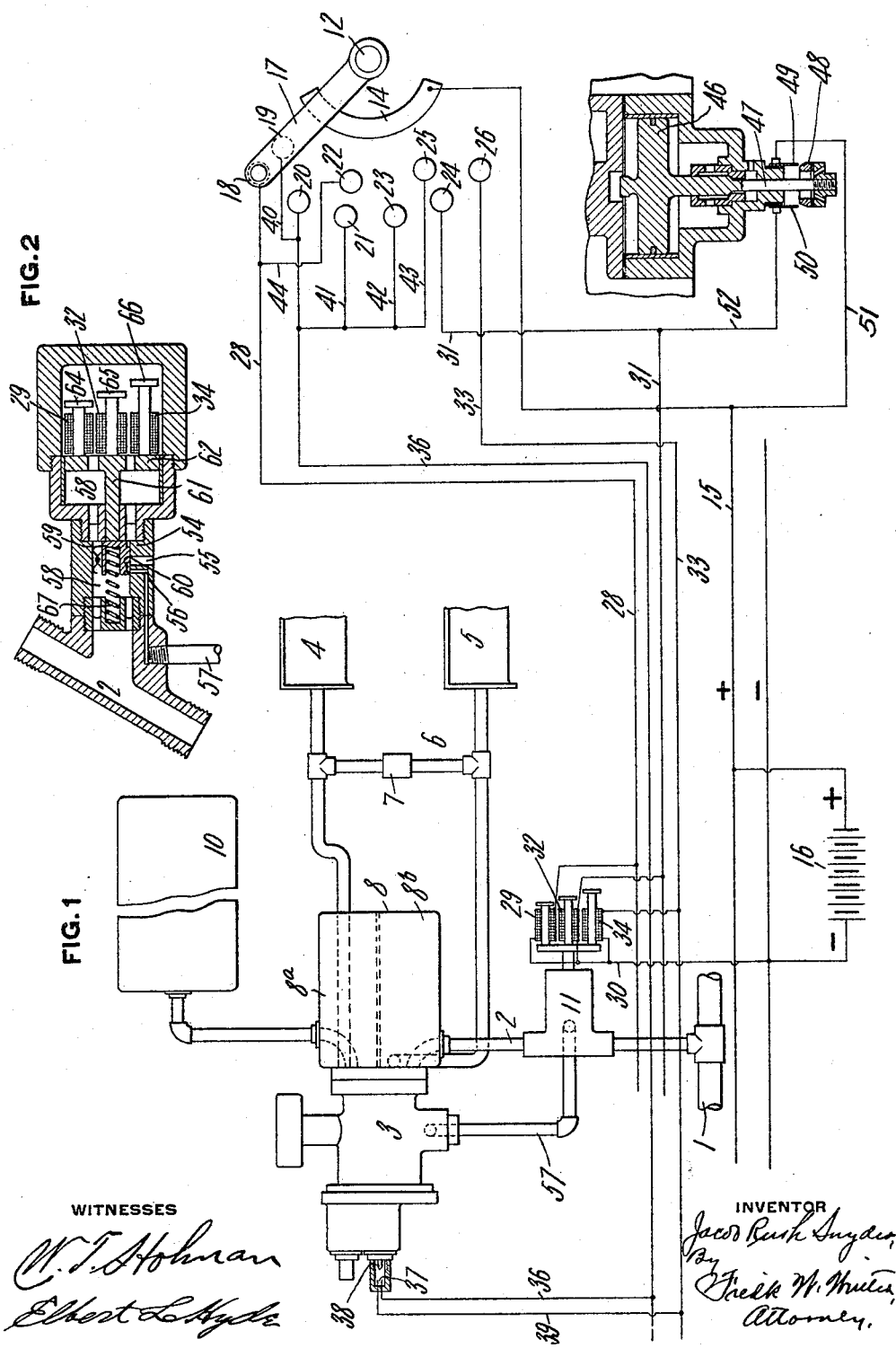

1,231,081.

Patented June 26, 1917.
4 SHEETS—SHEET 2.

WITNESSES

INVENTOR

J. R. SNYDER.
AIR BRAKE SYSTEM.
APPLICATION FILED JUNE 10, 1914.

1,231,081.

Patented June 26, 1917.
4 SHEETS—SHEET 3.

WITNESSES

INVENTOR

J. R. SNYDER.
AIR BRAKE SYSTEM.
APPLICATION FILED JUNE 10, 1914.

1,231,081.

Patented June 26, 1917.
4 SHEETS—SHEET 4.

WITNESSES
O. T. Holman
Elbert L. Hyde

INVENTOR
Jacob Rush Snyder,
By Fred'k N. Winter,
Attorney

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

AIR-BRAKE SYSTEM.

1,231,081.  Specification of Letters Patent.  Patented June 26, 1917.

Application filed June 10, 1914. Serial No. 844,274.

*To all whom it may concern:*

Be it known that I, JACOB RUSH SNYDER, a resident of Pittsburgh, in the county of Allegheny and State of Pennsylvania, have invented a new and useful Improvement in Air-Brake Systems, of which the following is a specification.

This invention relates to air brakes for railway cars, and more particularly to what are known as electro-pneumatic systems.

The object of the invention is to provide in one installation a complete pneumatic and a complete electric system, so that in the event of the electric means being deranged the pneumatic system will still operate in the usual way to control the train.

The invention comprises the arrangement and construction of parts hereinafter described and claimed.

Figure 10:
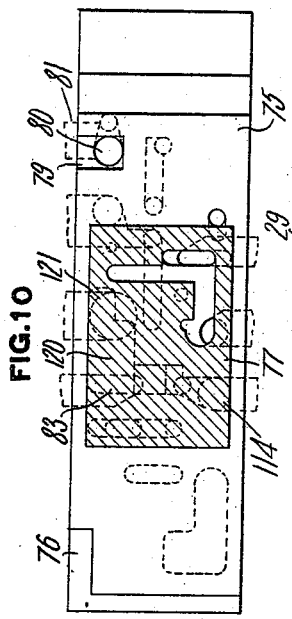
Figure 4:
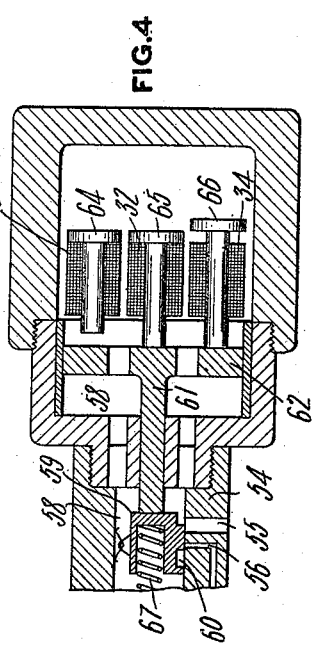
Figure 5:
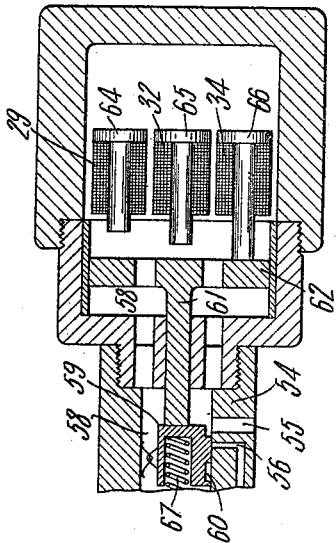
Figure 11:
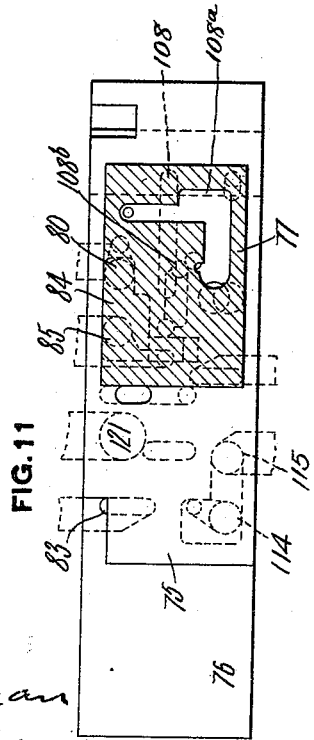
Figure 3:
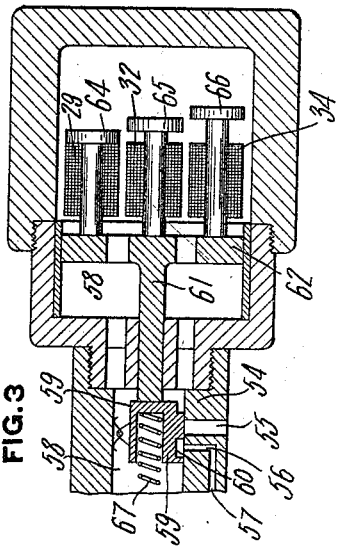
Figure 6:
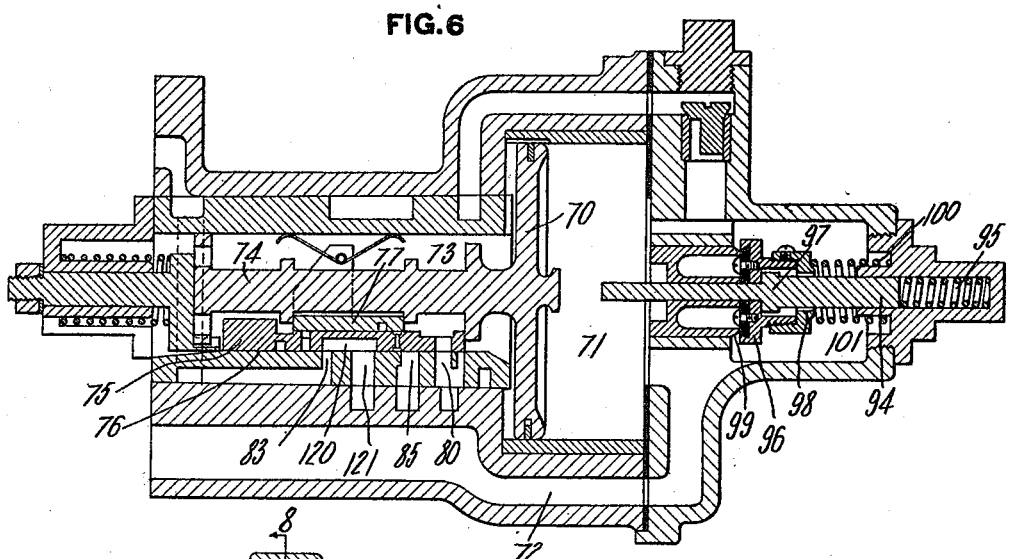
Figure 7:
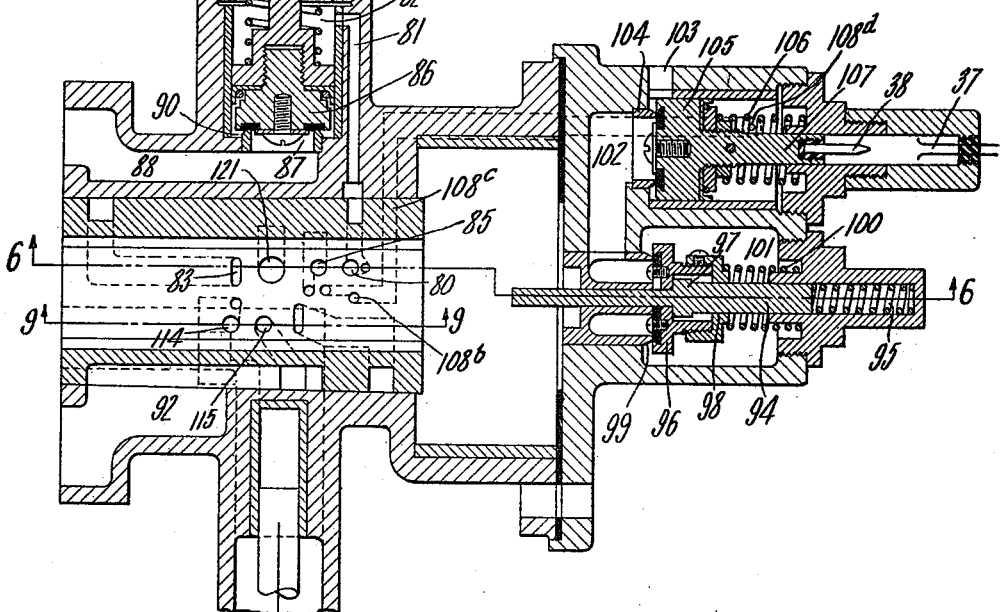
Figure 8:
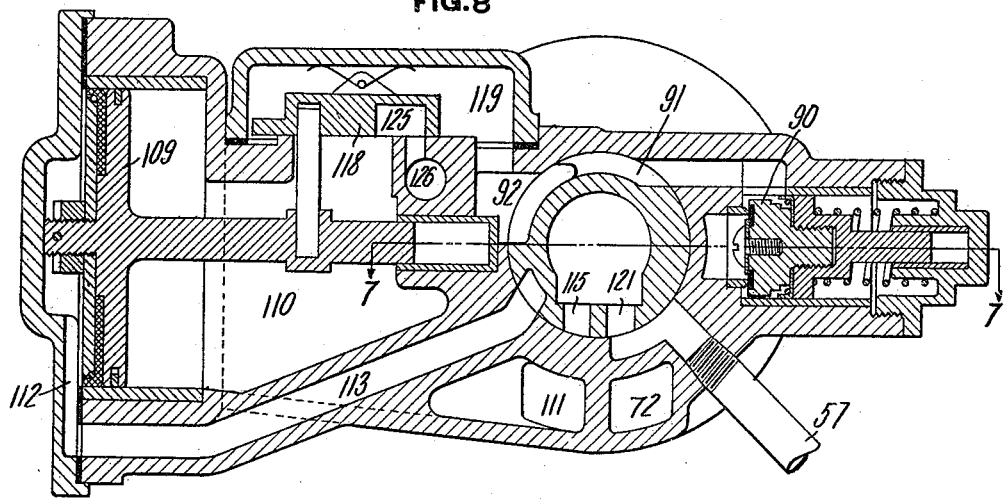
Figure 9:
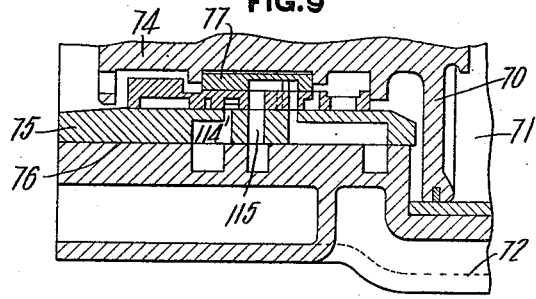
Figure 12:
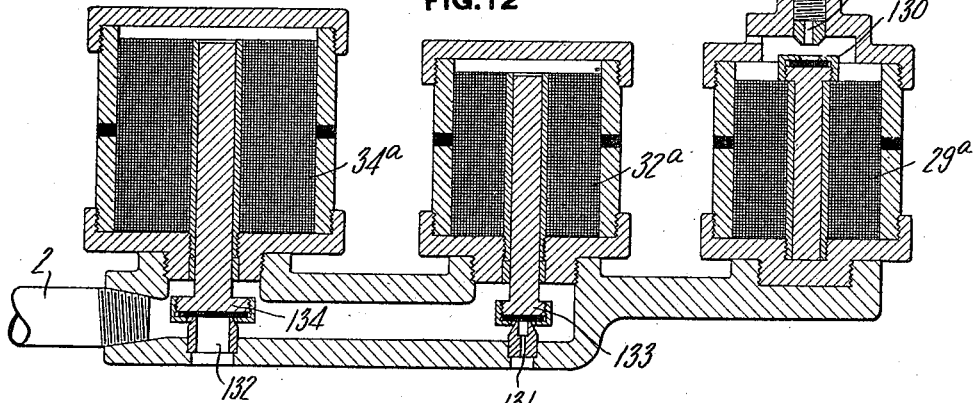

In the accompanying drawings Figure 1 is a diagrammatic view of those parts of an air brake system which are involved in the improvements of the present invention; Fig. 2 is a sectional view through the electrically operated valve showing the same in normal release or running position; Figs. 3, 4 and 5 are similar views of the valve showing the same respectively in holding, in service and in emergency positions; Fig. 6 is a vertical sectional view through the triple valve, the section being taken on the line 6—6, Fig. 7; Fig. 7 is a horizontal sectional view of the same taken on the line 7—7, Fig. 8; Fig. 8 is a transverse section through the same on the line 8—8, Fig. 7; Fig. 9 is a vertical longitudinal section on the line 9—9, Fig. 7; Figs. 10 and 11 are diagrammatic views of the triple valve seat and valves showing the same respectively in release and emergency positions; and Fig. 12 is a view of a modification.

In the accompanying drawings the electric system has been shown in connection with a special type of triple or control valve, which in its essentials is the same as that described and claimed in my application filed Feb. 13, 1914, Serial No. 818,571, but with certain additions thereto. It is to be understood however, that this specific type of triple valve is not essential to the operation of the electric system.

In the drawings the train pipe is indicated at 1, having a connection 2 to the triple or control valve 3. In the particular system illustrated two brake cylinders are employed, viz., a service brake cylinder 4 and an emergency brake cylinder 5, there being between these cylinders a connection 6 provided with a check valve 7 seating in such direction as to permit pressure to pass from the emergency brake cylinder to the service brake cylinder but not in the reverse direction. 8 is a divided reservoir, one part forming the auxiliary reservoir $8^a$, and the other part forming the application chamber $8^b$, and 10 is a supplementary reservoir, all of these parts being connected by suitable pipes, as will be readily understood by those skilled in the art.

11 is the electrically actuated valve which in this particular instance controls a vent from the train pipe and also controls the exhaustion of the brake cylinder, the latter being effected indirectly by controlling the exhaust from the application chamber piston, as will hereinafter more fully appear.

12 indicates diagrammatically the rotary member of the engineer's brake valve, and inasmuch as this valve may be of any type and performs the usual functions of an engineer's valve in increasing and reducing train pipe pressure to operate the system pneumatically, its pneumatic features are not illustrated, as these will be readily understood. As the movable part of the engineer's valve is rotated to its various positions, to-wit, release, running, holding, lap, service and emergency, it is also made to effect the several electrical connections for operating the system electrically, and only the necessary electrical connections are diagrammatically illustrated. These consist of a suitable contact 14 connected by the main 15 to the positive pole of the source of current 16; and a series of contacts arranged in arcuate relation to the member 12 and in position to be connected to the contact 14 by the switch arm 17 in the different positions of the engineer's brake valve. As shown in release position the contact 14 is connected by the switch 17 to a pair of contacts 18 and 19; in running position it is connected with contact 20; in holding position it is connected with a pair of contacts 21 and 22; in lap position it is connected with contact 23; in service position it is connected with a pair of contacts 24 and 25; and in emergency position it is connected with contact 26. The contact 18 is connected by wire 28 to one terminal of the holding magnet 29 whose other terminal is connected by wire 30 with the negative pole of the source of current 16. The contact 24 is connected by wire 31 with one terminal of the service magnet 32 whose other terminal is also connected by wire 30 with the negative pole of the source of current. The contact 26 is connected by wire 33 with one terminal of the emergency magnet 34 whose opposite terminal is connected by the wire 30 with the negative pole of the source of current. The contact 20 is connected by wire 36 with one member of a pair of contacts 37 arranged to be closed by means of a circuit closer 38 when the triple valve goes to emergency position, the other member of said pair of contacts being connected by wire 39 with the emergency main 33. This arrangement provides for automatically venting the train pipe at each car electrically when a hose bursts, and, consequently, it is desirable that this should be effected not only when the engineer's brake valve is in running position, but also when it is in all other positions except emergency position. To this end the main 36 is connected by branch 40 with the contact 19; by branch 41 with contact 21; by branch 42 with contact 23, and by branch 43 with contact 25; so that the same effect is produced whenever a hose bursts, whether the engineer's valve be in release, running, holding, lap or service position.

The contact 22 is also connected by wire 44 with the main 28 leading to the holding magnet, so that the same condition of the holding magnet is maintained in holding as in release position.

46 indicates the usual equalizing valve piston of the engineer's brake valve. The stem 47 of said piston at its lower end carries a circuit closer 48 which when the equalizing piston is in elevated position connects the terminals 49 and 50, the former of which is connected by wire 51 with the main 15 coming from the positive pole of the source of current, while the latter is connected by wire 52 with the main 31 leading to the service magnet. Consequently, the circuit through the service magnet is maintained as long as the equalizing piston 46 is up and entirely irrespective of whether the engineer's brake valve is in service position or has been returned to lap position since when the engineer's brake valve is moved to service position, the piston 46 moves up and remains up even though the engineer's brake valve is returned to lap position and independently of the length of time the brake valve has been held in service position. The proper evacuation of the train pipe at the car is thus insured irrespective of the length of time the engineer keeps his brake valve in service position.

The electrically actuated valve 11 comprises a suitable seat 54 in which are two ports, viz., a port 55 leading to the atmosphere and a small port 56 which connects by pipe 57 to the exhaust port of the triple valve, and the chamber 58 of the valve is open to the train pipe connection. On the seat 54 is a small slide valve 59 provided in its under face with a small cavity 60 and which valve is actuated by the stem 61 of a suitable member 62 which may be either a cross head or a piston arranged to be actuated by the several magnets hereinbefore described. As shown, the several magnets are provided with armatures or cores of different length. For instance, the holding magnet has a relatively short core 64, the service magnet a longer core 65, and the emergency magnet a still longer core 66. The valve normally stands in the position shown in Fig. 2, being held in that position by the tension of a spring 67. In this position the cavity 60 connects the triple valve release port 56 with the exhaust port 55. When the holding magnet 29 is energized its core 64 pushes the valve 59 inwardly (see Fig. 3) sufficiently to break this connection and blank all ports, so that the exhaust from the triple valve is closed, thereby permitting the train pipe to be recharged while holding the brakes applied. When the service magnet 32 is energized its core 65 pushes the slide valve 59 to the position shown in Fig. 4, in which a small vent is opened from the train pipe to the exhaust 55, thereby getting a light venting of the train pipe at each car. When the emergency magnet 34 is energized its core 66 pushes the valve 59 over still farther, (shown in Fig. 5), so as to fully open the exhaust 55, thereby producing a sudden reduction in train pipe pressure at each car.

The triple valve comprises the usual main piston 70 working in a chamber 71 connected through passage 72 on its outer face with the train pipe, while its inner face is subject to auxiliary reservoir pressure in chamber 73, as is usual. The stem 74 of piston 70 actuates the usual valves, which in the present instance are shown as a main slide valve 75 working on the seat 76 and having a slight lost motion connection with the piston stem 74, and a graduating slide valve 77 which moves on the upper face of the main slide valve and has no lost motion connection with the main piston stem. These two valves control a number of ports in the valve seat 76 to effect the various functions of the valve as fully described in the application hereinbefore identified, but as only two of the positions are of importance with the improvements of the present application, only those two positions are shown and only the active ports in those two positions are described. These two positions are respectively release position shown in Fig. 10 and emergency position shown in Fig. 11.

In release position the slide valve 75 effects the usual release function and in addition the notch 79 therein uncovers port 80, from which a passage 81 leads to a chamber 82 on the outer face of the emergency brake cylinder valve hereinafter more fully described. In emergency position the slide valve 75 effects the usual emergency functions and in addition the auxiliary reservoir is connected to port 83 leading to the application chamber, (but this has no effect except to reduce the auxiliary reservoir pressure), and the chamber 82 of the emergency brake cylinder valve is exhausted by having the port 80 connected by cavity 84 in the main slide valve to exhaust port 85.

The emergency brake cylinder valve 86 is substantially in the form of a piston and controls a port 87 connected by passage 88 to the emergency brake cylinder. On its upper face it is subject to whatever pressure may be in the chamber 82 hereinbefore referred to and also to the action of spring 89 which normally holds said valve to its seat. Its under face outside of the valve seat 87 is subject, in the annular space 90, to supplementary reservoir pressure which enters through passage 91 connecting to the longitudinal groove 92 in the triple valve casing. Consequently, when the pressure is released from the outer face of this emergency valve piston (when the triple valve is in emergency position, as shown in Fig. 11), the supplementary reservoir pressure in the annular space 90 lifts this valve and flows through the port 87 and passage 88 to the emergency brake cylinder. When the triple valve goes to release position auxiliary reservoir pressure is admitted through port 80 and passage 81 to the top of the emergency piston valve which together with the spring 89 closes said valve.

The outward movement of the triple valve piston 70 under reductions of train pipe pressure is controlled by the graduating stem 94 which is backed by the usual graduating spring 95. The stem 94 is slidable through a valve 96 and is provided with a collar 97 which when the stem is pushed outwardly by the main piston going to emergency position contacts with a sleeve 98 on the valve 96 and pulls said valve from its seat 99 against which it is normally held by spring 100, and train pipe pressure on its outer face. When the valve 96 is unseated, it connects the train pipe chamber 101 to a passage 102 leading to vent port 103. In this passage is a seat 104 with which coöperates the emergency vent valve 105 which is normally held against said seat by spring 106, but which is unseated by the outward flow of train pipe pressure whenever the valve 96 is unseated. The valve 105 is provided with a stem 107 and which carries the circuit closer 38 hereinbefore referred to, and which therefore in emergency position of the main piston closes the circuit between the terminals 37, the parts 37 and 38 constituting the emergency switch of the system. The circuit is, however, closed only a short time at the terminals 37, because the emergency vent valve is almost immediately seated by the admission of pressure behind it. The main slide valve has a long cavity 108, which in emergency position extends beyond the end 108$^a$ of the valve seat and hence admits auxiliary reservoir pressure to the port 108$^b$ which communicates through passage 108$^c$ with a port 108$^d$ behind the train pipe vent valve 105.

The triple valve is provided with a supplementary piston 109 whose inner face is subject to service brake cylinder pressure in chamber 110, which is connected with the service brake cylinder through passage 111; and on its outer face with pressure in the chamber 112 which is connected by passage 113 to a port 114 in the main valve seat, and which port together with application chamber port 83, in service application position is connected with the auxiliary reservoir. In emergency position port 114 is connected to supplementary reservoir port 115 so that in either case pressure is admitted to the outer face of the supplementary piston 109 to move the same inwardly and actuate the supplementary slide valve 118, moving the same to such position that it connects the supplementary reservoir space 119 with the service brake cylinder. In release position the port 114 leading to the outer face of the piston 109, as well as the application chamber port 83 are connected through a suitable cavity 120 with exhaust port 121 to which is connected the pipe 57 leading to the electrically actuated control valve 11. Consequently, the pressure can be drained from the chamber 112 on the outer face of piston 109 only when the valve 11 is in the normal position shown in Fig. 2, which is its condition when none of the three magnets 29, 32 and 34 are energized. After the application of the brakes the engineer will move his brake handle to release position, which as heretofore described will energize the holding magnet 29 and move the valve 59 to lap position, shown in Fig. 3, which will block the exhaust from the application piston chamber 112, as heretofore described, and will prevent the supplementary valve 118 from moving to release position. Consequently, while the engineer's brake valve handle is in release position, the valve is in effect in holding position, and the train pipe can be charged without releasing the brakes. This same condition applies when the engineer's brake valve handle is in holding position, in which case it closes the circuit from contact 14 to contact 22. To release the brakes the engineer's brake valve handle is brought to running position thereby deenergizing the magnet 29 and permitting the spring 58 to move the valve to release position, shown in Fig. 2. This drains the chamber 112 so that the service brake cylinder pressure on the inner face of piston 109 moves the valve 118 to the release position shown in Fig. 8, in which the service brake cylinder space 110 is connected through the cavity 125 to the exhaust port 126.

The triple valve described, in addition to the release and emergency positions which are specifically illustrated, also has a restricted recharging, a service, a service lap, an over-reduction and over-reduction lap position, all of which are fully illustrated and described in the application hereinbefore identified, but inasmuch as they are not involved in the particular improvements covered by this application they are not illustrated and will not be described. These several positions of the triple valve are all brought about by producing the proper variations in train pipe pressure through the manipulation of the engineer's brake valve, as will be readily understood, and constitute a complete pneumatic system which will operate effectively and in the desired way without any interference from or participation therein of the electric system, so that should the electric system become deranged, such as by exhaustion of the batteries, the train could nevertheless be controlled by the pneumatic system alone. The new feature in the pneumatic system disclosed herein consists in a suitable arrangement of the ports in the main valve seat so that in emergency application position the supplementary reservoir pressure does not enter the triple valve chamber at all, but through the medium of the emergency brake cylinder control valve 86 hereinbefore described is admitted directly to the emergency brake cylinder.

The electrical system is so arranged that it is operated by the usual manipulations of the engineer's brake valve, and requires no special manipulation whatsoever. When the engineer's brake valve is in release position, the holding magnet 29 is energized as hereinbefore described to prevent the exhaustion of pressure from the chamber 112 and prevent the supplementary valve from moving to release position. At the same time by means of contact 19 and a wire 36, one of the circuit terminals, 37, is energized. Consequently, should a hose burst, the circuit closer 38 carried by the emergency vent valve will be pushed between the terminals 37 and thus complete the circuit by way of wire 39 to the emergency magnet 34 and returning through wire 30 to the negative pole of the source of current, so that, electrically, there will be produced at each car an emergency venting of the train pipe so as to get a simultaneous emergency action of the triple valves on all of the cars of the train. Consequently, in all positions of the engineer's brake valve, except emergency position, the circuits are in such condition that in case of a burst hose on any one car the circuit through the emergency magnets of all cars will be energized.

In holding position the contact 14 is also connected with contact 22 and as the latter is connected to the main 28 the same condition of the holding magnet exists as in release position, viz., a condition in which the triple valve cannot release the brakes. In service position the circuit is completed through the service magnet, and at the same time the equalizing piston 46 closes the circuit between contacts 49 and 50, which are in a shunt from the main circuit, and this will maintain the circuit closed through the service magnet until proper evacuation of the train pipe pressure, because until this occurs the equalizing piston 46 will remain elevated. Consequently, the proper evacuation of the train pipe is secured entirely irrespective of the length of time the engineer maintains the engineer's brake valve in service position.

The electric system described requires no separate means for its manipulation, so that the engineer does not need to learn any new positions for his brake valve, or learn the operation of any switch members, the entire change in circuits being effected by merely moving the engineer's brake valve to its usual positions. The electric system in no way interferes with the normal operation of the air system by variations in train pipe pressure, but insures the substantially simultaneous actuation of the brakes throughout the train, either for releasing, for service application, or for emergency application, and also insures the simultaneous application of the brakes throughout the train, automatically, whenever a hose bursts, and also insures proper reduction of train pipe pressure to the necessary degree in service applications, automatically, and irrespective of whether the engineer maintains the brake valve in service position or not.

Fig. 12 shows a modification of the electric magnets, in which each magnet controls an independent exhaust valve. As here shown the holding magnet 29$^a$ through its armature actuates a valve 130 which controls an exhaust port 56$^a$ to which the pipe 57 is connected and serves to hold such exhaust closed in holding and release positions of the engineer's brake valve. 2 indicates the train pipe connection from which there are two ports, viz., a small service port 131 and a larger emergency port 132. The former is controlled by valve 133 carried by the core of the service magnet 32ª, while the emergency port is controlled by valve 134 carried by the core of the emergency magnet 34ª. The functional effect of the energization of each of these magnets is the same as in the form shown in Figs. 2, 3, 4, and 5.

What I claim is:—

1. In a pneumatic electric air brake system, the combination of a train pipe, an engineer's valve, a brake cylinder, a triple valve and a local reservoir, valve mechanism for controlling the release of the brake cylinder and the service and emergency evacuation of the train pipe, a holding magnet, a service magnet and an emergency magnet for actuating said valve mechanism respectively, a circuit controller actuated by movement of the engineer's valve and arranged in release and holding positions to energize the holding magnet, in service position to energize the service magnet, and in emergency position to energize the emergency magnet, and in other positions to deënergize all of said magnets.

2. In a pneumatic electric air brake system, the combination of a train pipe, an engineer's valve, a brake cylinder, a triple valve and a local reservoir, a single valve for controlling the release of the brake cylinder and for securing service and emergency evacuations of the train pipe, three magnets operatively connected to said valve for moving the same to different positions, circuits connected to said valves, and a circuit controller actuated by movement of the engineer's valve and arranged in each of different positions of the latter to energize one of said magnets.

3. In a pneumatic electric air brake system, the combination of a train pipe, an engineer's valve, a brake cylinder, a triple valve, and a local reservoir, valve mechanism for controlling the release of the brake cylinder and securing service and emergency evacuations of the train pipe, a holding magnet, a service magnet, a circuit controller for actuating said several magnets successively in different positions of said circuit controller, and a circuit closer arranged to be closed by the triple valve in emergency position and connected to the emergency magnet circuit.

4. In a pneumatic electric air brake system, the combination of a train pipe, an engineer's valve, a triple valve, and a local reservoir, valve mechanism for controlling the release of the brake cylinder and the service and emergency evacuation of the train pipe, a holding magnet, a service magnet and an emergency magnet for actuating said valve mechanism, a circuit closer arranged to be closed by the triple valve in emergency position and being connected in the emergency magnet circuit, and a circuit controller movable with the engineer's brake valve and arranged in release and holding positions to energize the holding magnet, in service position to energize the service magnet, and in emergency to energize the emergency magnet, and in all positions except emergency position to connect the circuit closer to a source of current.

5. In a pneumatic electric air brake system, the combination of a train pipe, an engineer's valve, an equalizing valve, a brake cylinder, a triple valve, and a local reservoir, valve mechanism for controlling the release of the brake cylinder and the service and emergency evacuation of the train pipe, a holding magnet, a service magnet, and an emergency magnet for actuating said valve mechanism, a circuit controller arranged in different positions to energize different ones of said magnets, and a circuit closer actuated by the equalizing valve and arranged to hold the service magnet circuit closed when the equalizing valve is opened and to break said circuit when the equalizing valve closes.

6. Air brake valve mechanism having connections to a train pipe, auxiliary reservoir, brake cylinder, and atmosphere, a movable abutment for actuating said valve mechanism and operated by variations in train pipe pressure for effecting the connections between the train pipe and auxiliary reservoir, the auxiliary reservoir and the brake cylinder, and the brake cylinder and the atmosphere, a supplementary valve mechanism for controlling communication from a source of pressure to a supplementary brake cylinder, a movable abutment for actuating the same, connections whereby when the main valve mechanism is in release position fluid pressure is admitted to said supplementary movable abutment to hold the supplementary valve closed and when the main valve mechanism is in emergency position pressure is exhausted from said supplementary valve to open the same, and a plurality of magnets arranged to be suitably energized electrically for controlling the functions of the valve.

7. Air brake valve mechanism having connections to a train pipe, auxiliary reservoir, brake cylinder, and the atmosphere, a movable abutment operated by variations in train pipe pressure for actuating said valve mechanism to effect connections between the train pipe and auxiliary reservoir, the auxiliary reservoir and brake cylinder, and the brake cylinder and atmosphere, a supplementary valve mechanism having connections to a supplementary reservoir and a supplementary brake cylinder, a movable abutment for actuating said supplementary valve and subject on one face to supplementary reservoir pressure, connections from the main valve mechanism when the latter is in release position to admit pressure to the opposite face of said supplementary abutment and hold the supplementary valve closed, and connections when the main valve mechanism is in emergency position to vent pressure from the one side of the supplementary abutment, whereby the supplementary reservoir pressure will open the supplementary valve and flow to the supplementary brake cylinder, and a plurality of magnets arranged to be suitably energized electrically for controlling the functions of the valve.

In testimony whereof, I have hereunto set my hand.

JACOB RUSH SNYDER.

Witnesses:
 ELBERT L. HYDE,
 GLENN H. LERESCHE.